United States Patent
Krein et al.

(10) Patent No.: US 11,928,015 B1
(45) Date of Patent: Mar. 12, 2024

(54) BUS REPEATER AND BIT INJECTOR FOR MIL-STD-1553/1760 COMMUNICATIONS BUS

(71) Applicant: National Technology & Engineering Solutions of Sandia, LLC, Albuquerque, NM (US)

(72) Inventors: Jason P. Krein, Albuquerque, NM (US); Jeremy W. Giron, Albuquerque, NM (US); Matthew S. Geuss, Albuquerque, NM (US); Robert Nevett, IV, Albuquerque, NM (US); Stephen T. Simpson, Albuquerque, NM (US); Roger Martin Kilgore, Placitas, NM (US); Jacob Edward Leemaster, Cambridge, MA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 195 days.

(21) Appl. No.: 17/708,555

(22) Filed: Mar. 30, 2022

(51) Int. Cl.
*G06F 11/07* (2006.01)
*G06F 13/42* (2006.01)

(52) U.S. Cl.
CPC ........ *G06F 11/079* (2013.01); *G06F 11/0745* (2013.01); *G06F 13/42* (2013.01)

(58) Field of Classification Search
CPC ..... G06F 11/079; G06F 11/0745; G06F 13/42
See application file for complete search history.

(56) References Cited

U.S. PATENT DOCUMENTS

| | | | |
|---|---|---|---|
| 5,325,359 A | 6/1994 | Jordan et al. | |
| 9,875,200 B2 | 1/2018 | Huber et al. | |
| 10,410,002 B1 | 9/2019 | Jenkins et al. | |
| 10,467,174 B2 | 11/2019 | Eckhardt et al. | |
| 11,133,927 B1 | 9/2021 | Jenkins | |
| 2017/0244813 A1* | 8/2017 | Hammel | B64D 7/00 |
| 2021/0105044 A1* | 4/2021 | Babich | H04L 1/0072 |

* cited by examiner

*Primary Examiner* — Jigar P Patel
(74) *Attorney, Agent, or Firm* — Samantha Updegraff; Calfee, Halter & Grisoled LLP

(57) ABSTRACT

A fault insertion device (FID) comprises a transceiver and an FPGA. The transceiver receives signals from a MIL-STD-1553/1760 communications bus. The FPGA evaluates the signals received from the communications bus against a set of rules stored by the FPGA. Based upon the set of rules, the FPGA can selectively modify messages received from the communications bus prior to transmission to a remote terminal or a bus controller that is configured to communicate on the communications bus.

20 Claims, 10 Drawing Sheets

| | ALT | MATCHING | | | | OUTPUT SELECT | | |
|---|---|---|---|---|---|---|---|---|
| BIT # | 7 | 6 | 5 | 4 | 3 | 2 | 1 | 0 |
| NAME | ALT=0 | BUS A | BUS B | VAL | DIR | OUT2 | OUT1 | OUT0 |

FIG. 3A

| BUS A | BUS B | VAL | MATCH FUNCTION |
|---|---|---|---|
| 1 | 0 | X | BUS A |
| 0 | 1 | X | BUS B |
| 1 | 1 | X | BUS A\|B |
| 0 | 0 | 0 | VAL DON'T CARE |
| 0 | 0 | 1 | RESERVED |

FIG. 3B

| OUT2 | OUT1 | OUT0 | OUTPUT SOURCE |
|---|---|---|---|
| 0 | 0 | 0 | OUT=IN |
| 0 | 0 | 1 | OUT=0 |
| 0 | 1 | 0 | OUT=1 |
| 0 | 1 | 1 | OUT=!IN |
| 1 | 0 | 0 | OUT=EVEN PARITY |
| 1 | 0 | 1 | OUT=ODD PARITY |
| 1 | 1 | 0 | OUT=1760 CHECKSUM |
| 1 | 1 | 1 | INHIBIT OUTPUT |

| BIT # | 7 | 6 | 5 | 4 | 3 | 2 | 1 | 0 |
|---|---|---|---|---|---|---|---|---|
| NAME | ALT | OP | \multicolumn{6}{c}{} | | | | | |

| BIT # | 7 | 6 | 5 | 4 | 3 | 2 | 1 | 0 |
|---|---|---|---|---|---|---|---|---|
| NAME | ALT | OP | D5 | D4 | D3 | D2 | D1 | D0 |
| | ALT=1 | OP | MILLISECONDS DELAY | | | | | |

| ALT | OP | D5-D0 | FUNCTION |
|---|---|---|---|
| 1 | 0 | | MS DELAY |
| 1 | 1 | 000000 | DELAY |
| 1 | 1 | 000001 | RESET ORIGIN |
| 1 | 1 | 000010 | SKIP |
| 1 | 1 | | RESET TO CURRENT ORIGIN |
| 1 | 1 | 111111 | END OF RULE SET |

402

BUS REPEATER AND BIT INJECTOR FOR MIL-STD-1553/1760 COMMUNICATIONS BUS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Modern commercial and military aircraft and spacecraft often have various components that are controlled by remote commands issued from a controller. MIL-STD-1553/1760 are system architectures and communications protocols that are commonly employed in both commercial and military aircraft and spacecraft to facilitate electronic control of aircraft/spacecraft components (e.g., fly-by-wire systems). An exemplary MIL-STD-1553/1760 control system includes a communications bus, a bus controller (or platform), and a remote terminal (or store). The remote terminal can include or be in communication with an input device, such as a sensor, or an output device, such as an actuator. The bus controller can be configured to receive control signals from a device such as a human-machine interface (HMI) or from another control system (e.g., an autopilot system of an aircraft). The bus controller can transmit messages to the remote terminal by way of the communications bus based upon the control signals. The messages can be configured to cause the remote terminal to perform some functionality. For instance, a pilot of an aircraft can provide control input to the aircraft by way of a yoke, a control system coupled to the yoke can detect motion of the yoke and can output control signals to a bus controller coupled to a MIL-STD-1553/1760 communications bus. The bus controller, responsive to receipt of the control signals, can transmit messages to a remote terminal that is coupled to an actuator that controls a position of a control surface of the aircraft. The messages are configured to cause the remote terminal to effectuate motion of the actuator in accordance with the control signals received by the bus controller. Thus, control surfaces of the aircraft can be controlled by way of messages transmitted over the MIL-STD-1553/1760 communications bus.

Proper functioning of a MIL-STD-1553/1760 control and communications system can be essential to the proper functioning of an aircraft or spacecraft. However, testing of such control and communications systems presents various challenges. For instance, due to timing requirements and constraints of a MIL-STD-1553/1760 communications bus, it may be difficult to selectively introduce communications faults on the communications bus to test a particular type of failure condition.

SUMMARY

The following is a brief summary of subject matter that is described in greater detail herein. This summary is not intended to be limiting as to the scope of the claims.

Various technologies relating to a system for field testing of a MIL-STD-1553/1760 communications and control system are described herein. With more particularity, technologies relating to a fault insertion device (FID) that facilitates causing selective communications faults on a MIL-STD-1553/1760 bus in real time based upon bus traffic are described herein.

In an exemplary embodiment, an aircraft includes a MIL-STD-1553/1760 communication system. The MIL-STD-1553/1760 communication system comprises a communications bus, a bus controller, and a remote terminal. The communications bus, the bus controller, and the remote terminal are configured for operation according to the MIL-STD-1553/1760 communications protocols. The bus controller is configured to initiate communication by way of the communications bus. The remote terminal is configured to respond to commands that it receives from the bus controller by way of the communications bus. The bus controller can be configured to receive control input from control devices included on the aircraft, such as a human-machine interface (HMI, e.g., a control yoke in a manned aircraft) or other control system that facilitates automated control of the aircraft. The remote terminal can be configured to receive data from sensors mounted on the aircraft, or to control operation of a mechanical system on the aircraft. In embodiments wherein the remote terminal is configured to receive data from sensor, the bus controller can transmit first messages on the communications bus that cause the remote terminal to transmit second messages that are indicative of the data received from the sensor. In embodiments wherein the remote terminal is configured to control operation of a mechanical system, the bus controller can transmit third messages on the communications bus that cause the remote terminal to control the operation of the mechanical system in accordance with control input received by the bus controller (e.g., from an HMI).

In connection with testing functionality of the aircraft and its MIL-STD-1553/1760 communication system, the aircraft can be configured to include a FID. The FID is configured to receive messages transmitted by way of the communications bus of the MIL-STD-1553/1760 communications system. In exemplary embodiments described herein, the FID can be inserted into the MIL-STD-1553/1760 communications system of the aircraft when the aircraft is on the ground for testing purposes. However, it is to be understood that in some embodiments, a FID can be included on the aircraft while the aircraft is airborne. The FID can be configured to selectively modify a message transmitted on the communications bus, based upon the received messages. The FID can modify a message transmitted on the communications bus by the bus controller prior to the message being received by the remote terminal (or vice versa) to simulate a fault condition associated with the MIL-STD-1553/1760 communication system of the aircraft and/or cause one or more systems controlled by the MIL-STD-1553/1760 communication system to exhibit a particular behavior. Accordingly, the FID can be employed to test failure modes of various components of the aircraft that are controlled by way of the MIL-STD-1553/1760 communication system.

An exemplary FID comprises a transceiver and a field-programmable gate array (FPGA). The transceiver is configured to receive and transmit signals along the MIL-STD-1553/1760 communications bus, wherein the signals are indicative of binary values, or bits. The FPGA can receive data indicative of the binary values from the transceiver. The FPGA is configured to evaluate the bits against a set of rules. Responsive to determining that a bit matches a rule in the set of rules, the FPGA can perform an action specified by the matched rule. By way of example, and not limitation, the transceiver of the FID can receive a first signal transmitted by way of the communications bus, wherein the first signal is indicative of a first bit. The FPGA can determine that the first bit matches a first rule in the set of rules stored by the FPGA. The first rule can specify that when a bit matches the first rule, the bit should be changed and retransmitted. The FPGA can cause the transceiver to transmit a second signal, where the second signal is indicative of a second bit that is different from the first bit. For instance, the second signal can be transmitted to a remote terminal or a bus controller, wherein the FID is communicatively coupled between the communications bus and the remote terminal/bus controller. In various embodiments, a rule can specify that a bit should not be modified before retransmission on the communications bus. Thus, the FID can "pass through" both unmatched and matched bits, depending upon the action specified by a matched rule.

The FID can be configured to evaluate messages received from the MIL-STD-1553/1760 communications bus on a bitwise basis. MIL-STD-1553/1760 messages generally comprise 18 bits: a "sync" bit, 16 message bits, and a parity bit. Due to the timing of MIL-STD-1553/1760 communications, if the FID received and evaluated the entirety of a MIL-STD-1553/1760 message prior to retransmitting the message, the bus controller and/or the remote terminal may be able to detect a fault on the communications bus, thereby affecting the operation of the aircraft that is intended to be tested by the FID. Thus, during receipt of a multi-bit message by the transceiver from the communications bus, the FPGA evaluates each successive bit upon receipt.

In an exemplary embodiment, the set of rules stored by the FPGA is an ordered set of rules that is collectively configured to implement an intended fault insertion functionality by bitwise evaluation and modification of MIL-STD-1553/1760 messages. The FPGA receives a first bit of a message transmitted by way of the communications bus. The FPGA evaluates the first bit against a first rule in the ordered set of rules, to determine if the first bit matches the first rule. If the first bit does not match the first rule, the FPGA can cause the first bit to be retransmitted along the communications bus unchanged. If the first bit matches the first rule, the FPGA performs an action specified by the first rule (e.g., cause the first bit to be retransmitted unchanged, or change the value of the first bit prior to retransmission).

The FPGA can maintain a rule counter that identifies a position within an ordered set of rules. If the first bit does not match the first rule, the FPGA can reset the rule counter to a current origin position within the ordered set of rules. If the first bit does match the first rule, the FPGA can increment the rule counter. Responsive to receipt of a second bit, the FPGA evaluates the second bit against the rule at the updated position of the rule counter. Hence, if the first bit does not match the first rule, and the first rule is at the current origin position within the ordered set of rules, the FPGA evaluates the second bit against the first rule. If the first bit does match the first rule, the FPGA evaluates the second bit against a second rule that follows the first rule in the ordered set of rules. The FID can therefore implement complex fault insertion functionality based upon the ordered set of rules, wherein the FID can wait for a specified message pattern to be received prior to inserting a fault in the communications system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3A is a diagram of an exemplary opcode scheme.

FIG. 3B is a truth table of certain exemplary functionality according to the opcode of FIG. 3A.

FIG. 3C is a truth table of further exemplary functionality according to the opcode of FIG. 3A.

FIG. 4A is a diagram of another exemplary opcode scheme.

FIG. 4B is a truth table illustrating certain exemplary functionality according to the opcode of FIG. 4A.

DETAILED DESCRIPTION

Figure 1:
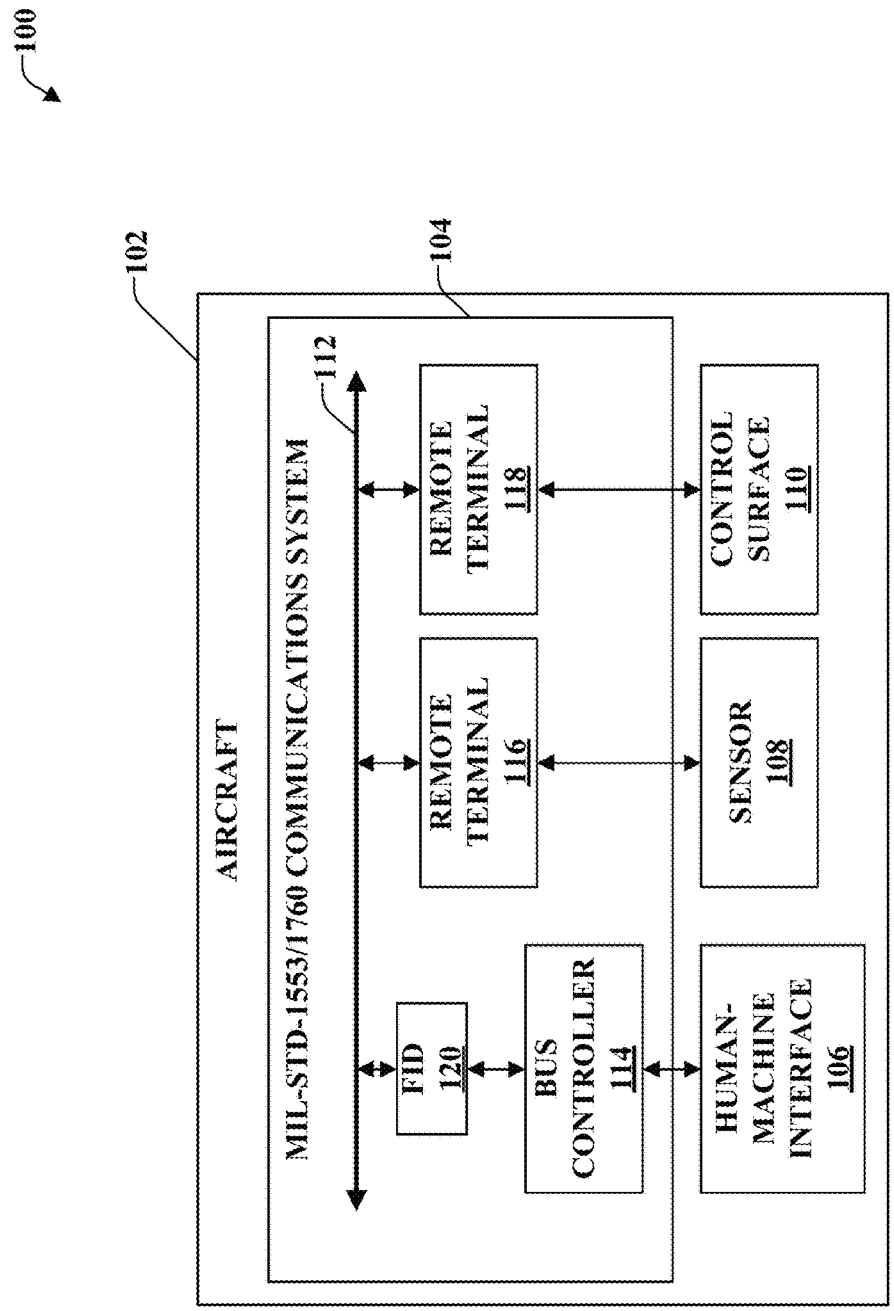
FIG. 1 is a functional block diagram of an exemplary system that facilitates selectively causing faults on a MIL-STD-1553/1760 communications system.

Various technologies pertaining to a system for field testing of a MIL-STD-1553/1760 communications and control system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference. Further, as used herein, the term "MIL-STD-1553/1760 communications bus" is intended to encompass communications buses that are configured for communications according to the MIL-STD-1553 protocol, the MIL-STD-1760 protocol, or both protocols.

With reference to FIG. 1, an exemplary system 100 that facilitates testing of a MIL-STD-1553 communication and control system is illustrated. The system 100 includes an aircraft 102 on which are mounted a MIL-STD-1533/1760 communication system 104, an HMI 106, a sensor 108, and a control surface 110. The HMI 106 is an interface by way of which a pilot of the aircraft 102 controls the aircraft 102 (e.g., by controlling operation of the control surface 110) and/or receives information from sensors mounted on board the aircraft 102 (e.g., the sensor 108). The sensor 108 can be any of various types of sensor such as an altimeter, a gyroscope, a temperature sensor, etc. The control surface 110 can be, for example, an elevator, rudder, aileron, flap, spoiler, or the like.

The HMI 106, sensor 108, and control surface 110 are in communication by way of the MIL-STD-1553/1760 communications system 104. The exemplary communications system 104 illustrated in FIG. 1 comprises a MIL-STD-1553/1760 communications bus 112, a bus controller 114, and two remote terminals 116, 118. The bus controller 114 communicates with the remote terminals 116, 118 by way of the communications bus 112. The bus controller 114 is configured to initiate communication that occurs over the communications bus 112. For instance, the bus controller 114 can issue commands to the remote terminals 116, 118 by way of the communications bus 112, and the remote terminals 116, 118 can respond to these commands by transmitting messages over the communications bus 112. While they are illustrated as being distinct components, the bus controller 114 and the remote terminals 116, 118 can be components of the HMI 106, the sensor 108, and the control surface 110, respectively. Furthermore, the bus controller 114 can be configured to perform various control functionality beyond simple control of traffic on the MIL-STD-1553/1760 communications bus 112. For instance, the bus controller 114 may be configured to perform autopilot functionality or other type of fully- or partially-automated control of the aircraft 102, based in part on traffic received by way of the communications bus 112 (e.g., sensor data, transmitted by the remote terminal 116, that indicates an output of the sensor 108).

A pilot of the aircraft 102 can provide control input to the aircraft 102 by way of the HMI 106. The HMI 106 can output a control signal to the bus controller 114 that is indicative of the control input received by the HMI 106. Responsive to receipt of the control signal, the bus controller 114 can communicate with the remote terminal 118 (e.g., by way of the communications bus 112) to cause the remote terminal 118 to effectuate operation of the control surface 110 based upon the control signal. For example, the bus controller 114 can transmit a command to the remote terminal 118 that causes the remote terminal 118 to operate an actuator (not illustrated) that is included on the control surface 110, wherein operation of the actuator moves the control surface 110 consistent with the control input set forth by way of the HMI 106.

Operation of the MIL-STD-1553/1760 communications system 104 of the aircraft 102 can be observed by suitable instrumentation components that can be inserted in the communications system 104. For example, an additional stub remote terminal can be connected to the communications bus 112, which stub remote terminal can record all traffic transmitted over the bus 112. Such stub remote terminal can alternatively be referred to as a bus monitor. However, mere observation and recording of bus traffic may be insufficient to test intended functionality of the various systems of the aircraft 102 (such as, but not limited to, the HMI 106, sensor 108, and control surface 110). In a non-limiting example, it may be desirable to test the functionality of the control surface 110 when the remote terminal 118 that controls the control surface 110 receives an erroneous command from the bus controller 114. In another example, it may be desirable to test the functionality of the bus controller 114 when the bus controller 114 receives faulty sensor data from the remote terminal 116 connected to the sensor 108 (e.g., when the bus controller 114 is performing some automated control functions for the aircraft 102). While it may be possible to simulate operations of a MIL-STD-1553/1760 communications system in a software environment, such simulations are generally not suited to field testing of specific integrated systems that incorporate a MIL-STD-1553/1760 communication system (e.g., the aircraft 102).

Accordingly, the MIL-STD-1553/1760 communications system 104 can include a fault-insertion device (FID) 120. The FID 120 is configured to receive signals transmitted by way of the MIL-STD-1553/1760 communications bus 112 and to selectively modify such signals to test functionality of the aircraft 102 in response to various fault conditions (e.g., a fault of the communications system 104 or a fault of a component that interfaces with the communications system 104 such as the sensor 108 or the control surface 110). In the exemplary system 100 shown in FIG. 1, the FID 120 is positioned between the bus controller 114 and the communications bus 112. In this configuration, the FID 120 receives all traffic that the bus controller 114 attempts to transmit over the bus 112 prior to such traffic being transmitted over the bus 112. Since MIL-STD-1553/1760-compliant communications systems generally rely on a bus controller to initiate communication over a bus, the placement of the FID 120 shown in FIG. 1 can allow the FID 120 to receive and selectively modify most traffic occurring on the bus 112. However, in some applications, the FID 120 can instead be positioned between the remote terminal 116 and the bus 112, or the remote terminal 118 and the bus 112. For instance, at least some functionality of the control surface 110 may depend solely on commands issued by the bus controller 114. In these applications, the FID 120 can be inserted between the remote terminal 118 and the bus 112 rather than between the bus controller 114 and the bus 112 (e.g., because it may be easier to access the remote terminal 118 than the bus controller 114).

Figure 2:
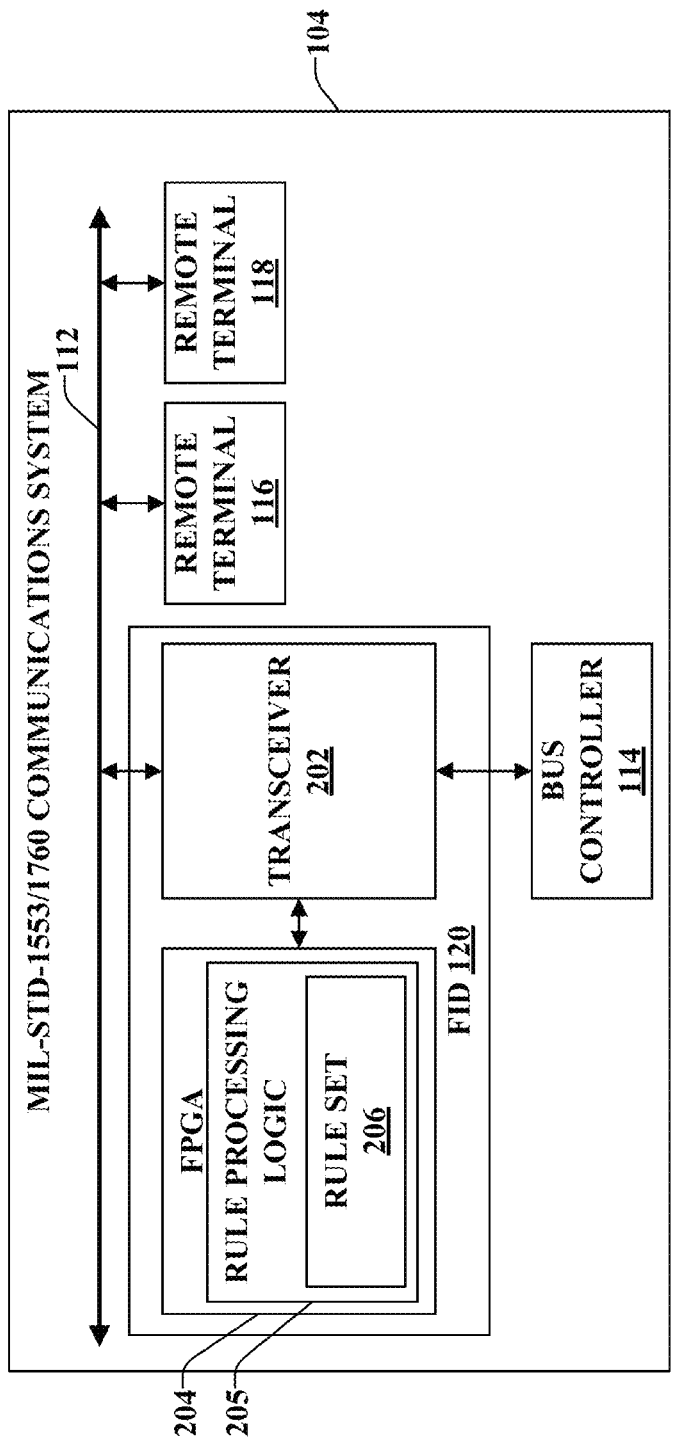
FIG. 2 is a functional block diagram of certain details of the exemplary system of FIG. 1.

Referring now to FIG. 2, various details of the MIL-STD-1553/1760 communications system 104 are illustrated. The FID 120 includes a transceiver 202 and an FPGA 204. Briefly, the transceiver 202 is configured to receive and transmit signals according to the MIL-STD-1553/1760 communications protocols. The signals transmitted and received by the transceiver 202 are indicative of messages that comprise digital values. The FPGA 204 is configured to evaluate the messages indicated by the signals received by the FID 120 (by way of the transceiver 202) against a rule set 206 stored by the FPGA 204. The FPGA 204, based upon the rule set 206 and the messages, selectively modifies the messages before they are re-transmitted by the transceiver 202 along the bus 112 or to the bus controller 114. By this selective modification of messages, the FID 120 can selectively introduce communication faults in the MIL-STD-1553/1760 communications system 104 to simulate certain failure conditions that are desirably tested by an operator of the FID 120. Further, by appropriate configuration of the rule set 206, the FID 120 can selectively introduce these faults based on a history of communications transmitted along the bus 112, as will be described in greater detail below.

The transceiver 202 receives signals from the bus 112 and transmits signals along the bus 112, wherein these signals conform to MIL-STD-1553/1760 signal specifications. Similarly, the transceiver 120 receives signals from the bus controller 114 and transmits signals to the bus controller 114, wherein these signals conform to MIL-STD-1553/1760 signal specifications. For the sake of simplicity, the transceiver 202 is shown in FIG. 2 as a single transceiver. However, it is to be understood that the transceiver 202 can include multiple transceivers each configured to communicate with a different device or system. For example, the transceiver 202 can include a first transceiver that is configured to communicate with the bus controller 114 and a second transceiver that is configured to communicate with the communications bus 112. In such embodiments, the FPGA 204 can be configured to send and receive data to each of the first and second transceivers. The transceiver 202 is configured such that each of the bus controller 114 and the remote terminals 116, 118 can function as if the FID 120 were not present in the communications system 104. Stated differently, the bus controller 114 and the remote terminals 116, 118 do not need to be reconfigured to account for the presence of the FID 120. For example, the FID 120 can be configured such that the bus controller 114 connects to the transceiver 202 in the same manner as the bus controller 114 would connect to the bus 112 (e.g., by way of a same connector cable). The FID 120 is therefore well-suited to testing of MIL-STD-1553/1760 communications systems in field-deployed conditions. To facilitate transmission and receipt of signals along/from the MIL-STD-1553/1760 communications bus 112, the transceiver 202 can include various components that are collectively configured to facilitate transmission and receipt of signals by way of the bus 112. For example, such components can include transmission lines, connectors, sample-and-hold circuits, latches, or the like.

Signals transmitted along the communications bus 112 or from the bus controller 114 to the transceiver 202 are indicative of digital bit values. Generally, a data word conforming to the MIL-STD-1553 protocol is 18 bits long. The FPGA 204 receives, from the transceiver 202, data that is indicative of the digital bit values indicated in the signals that the transceiver 202 receives. The FPGA 204 evaluates the bit values against the rule set 206. The rule set 206 specifies matching conditions and actions to be performed relative to messages received by the FID 120 from the bus controller 114 and/or the communications bus 112. With greater specificity, the rule set 206 specifies matching conditions that determine whether a message or partial message that is received by the FID 120 is a match to the rule set 206. Further, the rule set 206 specifies an action to be performed by the FPGA 204 responsive to the message or partial message matching the rule set 206. In exemplary embodiments, these actions can include retransmission of the message in an unmodified state (e.g., to the bus controller 114 or the communications bus 112 depending on the origin of the message), or retransmission of the message after modifying the message.

Due to message timing requirements and the time-length of messages according to the MIL-STD-1553/1760 communication standard, if the FID 120 waits until a complete MIL-STD-1553/1760 data word is received before determining whether and/or how to modify the data word for retransmission, a bus fault that is observable by the bus controller 114 and/or the remote terminals 116, 118 will result. Thus, the FPGA 204 is configured to evaluate the messages received by the transceiver 202, whether from the bus controller 114 or the communications bus 112, on a bit-by-bit basis. The transceiver 202 can be configured to output, to the FPGA 204, a bit stream that comprises bit values indicated by the signals received by the transceiver 202.

Responsive to receiving a bit from the transceiver 202, the FPGA 204 evaluates the bit against a rule in the rule set 206 to determine whether the bit meets a match condition specified by the rule. If the bit meets the match condition, the FPGA 204 takes an action specified by the rule. In an example, the rule can specify that if the rule is matched, then the matching bit should be modified and retransmitted. In another example, the rule can specify that if the rule is matched, then the matching bit should be retransmitted without modification. In yet another example, the rule can specify that if the rule is matched, then the matching bit should be set to a specific value specified by the rule.

The match condition specified by a rule can be based upon a value of the bit or a source from which the signal indicating the bit was received (e.g., the communications bus 112 or the bus controller 114). In some embodiments, the communications bus 112 can be a redundant communications bus that has multiple transmission lines. In such embodiments, the match condition can be further based upon which of multiple transmission lines the signal is received from.

In an exemplary embodiment, each of the rules in the rule set 206 can be embodied by a binary operation code that specifies a rule matching condition and an action to be performed responsive to receiving a bit that matches the rule matching condition. For example, and referring now to FIG. 3A, an exemplary binary operation code (opcode) 300 is shown. The opcode 300 comprises 8 bits. Thus, the opcode 300 can be stored as a single byte in memory of the FPGA 204. The opcode 300 includes 3 output select bits, 4 matching bits, and 1 alternate function code bit. The matching bits specify a match condition for the rule defined by the opcode 300. The output select bits specify an action that is taken by the FPGA 204 responsive to the opcode 300 being matched by a received bit. The alternate function code bit can be used to indicate an alternate set of functions to be performed by the FPGA 204 according to the opcode 300, as will be described in greater detail below with respect to FIGS. 4A and 4B.

The four matching bits of the opcode 300 specify four match conditions for bits received by the FPGA 204: BUSA, BUSB, VAL, and DIR. BUSA and BUSB indicate which of multiple redundant bus transmission lines a matching bit will be received from (e.g., bus A or bus B), VAL indicates a bit value that will be considered a match, and DIR indicates a direction from which a received bit will be considered a match (e.g., whether a bit is a match if received from the bus controller 114 or from the communications bus 112). Referring now to FIG. 3B, a truth table 302 of exemplary matching conditions for the opcode 300 is illustrated. In the truth table 302, the DIR bit is omitted for brevity. Thus, for purposes of explanation of the truth table 302, it will be assumed that the DIR bit is matched for a given received bit. It is to be understood that responsive to receipt of a bit from the transceiver 202, the FPGA 204 evaluates whether the DIR bit is matched when evaluating rules in the rule set 206.

When BUSA takes the value "1" and BUSB takes the value "0," the FPGA 204 considers a received bit to be a match if the received bit originates from bus A and takes the value indicated by the VAL matching condition. When BUSA takes the value "0" and BUSB takes the value "1," the FPGA 204 considers the received bit to be a match if the received bit originates from bus B and takes the value indicated by the VAL matching condition. When BUSA takes the value "1" and BUSB takes the value "1," the FPGA 204 considers the received bit to be a match if the received bit originates from either bus A or bus B. When BUSA takes the value "0," BUSB takes the value "0," and VAL takes the value "0," the FPGA 204 considers the received bit to be a match regardless of the value of the bit or from which of bus A or bus B the bit was received. The combination of BUSA taking the value "0," BUSB taking the value "0," and VAL taking the value "1" can be a reserved state that is not employed during ordinary operation of the FPGA 204.

In order to evaluate the match conditions associated with a rule in the ruleset 206, the FPGA 204 can receive additional data from the transceiver 202 that indicates, for example, from which of multiple transmission lines a bit is received, or from which direction (e.g., from the bus controller 114 or from the communications bus 112) the bit was received. It is to be understood that in embodiments wherein the communications bus 112 includes only a single bus transmission line, one or both of BUSA or BUSB can be configured as a "don't care" value such that the matching conditions of a rule are evaluated against only the single bus transmission line.

The rule set 206 can include a plurality of rules, each of which has different matching conditions (e.g., as specified by matching bits in an opcode that defines the rule). The rule set 206 can be an ordered set of rules that are evaluated by the FPGA 204 in a given order. In exemplary embodiments, the FPGA 204 evaluates each bit that is received from the transceiver 202 against a single rule in the rule set 206. In these embodiments, a rule against which a received bit is evaluated is determined by an address counter maintained by the FPGA 204. Responsive to determining that a received bit is not a match for a currently-addressed rule in the rule set 206, the FPGA 204 can perform various default functionality. For example, the FPGA 204 can return the address counter to an origin location in the rule set 206 (e.g., a first rule in the rule set). In another example, the FPGA 204 can cause the transceiver 202 to retransmit the received bit responsive to determining that the received bit does not match the currently-addressed rule in the rule set 206. Illustrating further, the bus controller 114 can transmit a signal that is indicative of a first bit value to the transceiver 202. The transceiver 202 outputs the first bit value and/or various additional data that may be relevant to rule matching conditions to the FPGA 204. The FPGA 204 evaluates the first bit value (and any additional data relevant to rule matching) against matching conditions of a currently-addressed rule in the rule set 206. Responsive to determining that the first bit value does not match the currently-addressed rule, the FPGA 204 causes the transceiver 202 to transmit the same first bit value to the bus 112. Similarly, if the FID 120 determines that a second bit value received from the bus 112 does not match a currently-addressed rule in the rule set 206, the FID 120 can transmit the second bit value to the bus controller 114. In other words, if a received bit does not match the currently-addressed rule in the rule set 206, that bit can be "passed through" by the FID 120 such that the bit is provided to the bus 112 or the bus controller 114, depending on where the bit originated from.

If the FPGA 204 determines that a received bit does match a rule in the rule set 206 (e.g., a currently-addressed rule), the FPGA 204 can perform an action specified by the rule. For example, in embodiments wherein rules are specified according to the binary opcode 300, the FPGA 204 can perform an action specified by the output select bits OUT0, OUT1, OUT2.

Referring now to FIG. 3C, a truth table 304 is shown that illustrates exemplary operations that can be specified by the opcode 300 and performed by the FPGA 204 responsive to the opcode 300 being matched by a received bit. When the output select bits take the value '000', the FPGA 204 can cause the transceiver 202 to output the same bit that was received. When the output select bits take the value '001', the FPGA 204 can cause the transceiver 202 to output '0'. When the output select bits take the value '010', the FPGA 204 can cause the transceiver 202 to output '1'. When the output select bits take the value '011', the FPGA 204 can cause the transceiver 202 to output a bit having the opposite value of the bit that was received. When the output select bits take the value '100', the FPGA 204 can cause the transceiver 202 to output an even parity bit. When the output select bits take the value '101', the FPGA 204 can cause the transceiver 202 to output an odd parity bit. When the output select bits take the value '110', the FPGA 2045 can cause the transceiver 202 to output a MIL-STD-1760 checksum value, as will be described in greater detail below. When the output select bits take the value '111', the FID 120 can inhibit output to the bus 112 or the bus controller 114, which may cause a communication fault on the bus 112.

As indicated above with respect to FIG. 3A, the opcode 300 includes an alternate function bit, "ALT," that can be used to cause the FPGA 204 to perform functionality other than matching and output select as defined by the matching and output select bits of the opcode 300. Referring now to FIG. 4A, a scheme for another exemplary opcode 400 is shown, wherein the "ALT" bit of the opcode 400 takes the value '1'. The opcode 400 further includes an op mode bit "OP" and 6 delay/operation select bits "D5"-"D0."

Referring now to FIG. 4B, a truth table 402 is shown, wherein the truth table 402 indicates various functionality that is performed by the FPGA 204 for different values of the opcode 400. When the OP bit takes the value 0, the FPGA 204 implements a time delay function, wherein the FPGA 204 refrains from evaluating further received bits against the rules of the rule set 206 for a time, in milliseconds, specified by the delay bits D5-D0. Since there are 6 bits D5-D0, the delay can vary in one millisecond increments from 1 millisecond (e.g., when D5-D0 take the value '000000') to 64 milliseconds (e.g., when D5-D0 take the value '111111'). It is to be understood that the increment of the delay specified by the delay bits D5-D0 can be other than one millisecond.

When the OP bit takes the value 1, the FGPA 204 can implement various functions that are specified by the bits D5-D0, functioning as operation select bits. When the bits D5-D0 take the value '000000', the FPGA 204 can perform a reset origin function with respect to an address counter for the rule set 206. The reset origin function sets the origin for the address counter at a next rule in the rule set 206. Thus, if the FPGA 204 is programmed to return to the origin of the address counter when a rule match fails, the reset origin function can be used to set the first rule that is used by the FPGA 204 for evaluating bits when rule match failures occur. When the bits D5-D0 take the value '000001', the FPGA 204 can perform a skip function that causes the FPGA 204 to skip a next-received bit (e.g., to fail to evaluate a next-received bit against the rule set 206). When the bits D5-D0 take the value '000010', the FPGA 204 can perform a reset to last origin function that causes the address counter associated with the rule set 206 to return to the current origin position of the address counter. When the bits D5-D0 take the value '111111', the opcode 400 indicates that the end of the rule set 206 has been reached. In various embodiments, the FPGA 204 can be configured to execute the rule set 206 a predefined number of times. Responsive to executing an opcode in which D5-D0 take the value '111111', the FPGA 204 can increment a counter associated with the rule set 206, indicating that the FPGA 204 has completed an execution of the rule set 206.

Figure 5:
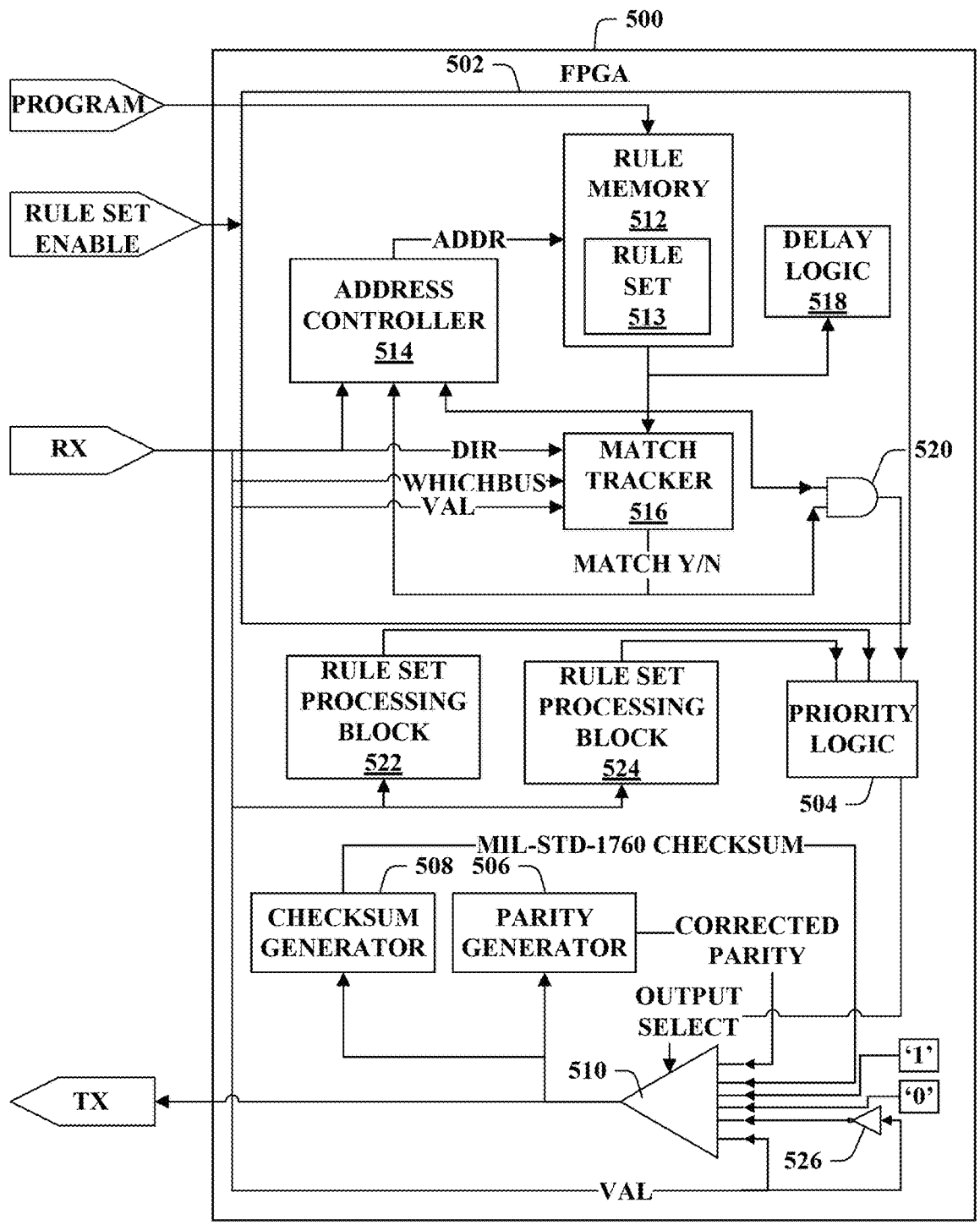
FIG. 5 is a block diagram of an exemplary FPGA.

Referring now to FIG. 5, a functional block diagram of an exemplary FPGA 500 that is included in a FID (e.g., the FID 120) is illustrated. The FPGA 500 includes a rule set processing block 502, a priority logic component 504, a parity generator 506, a checksum generator 508, and an output buffer 510. Briefly, the rule set processing block 502 is configured to evaluate bits received from a MIL-STD-1553/1760 communications bus (e.g., the bus 112) and/or a terminal configured for MIL-STD-1553/1760 communication (e.g., the bus controller 114 or the remote terminals 116, 118) against a rule set that is stored in memory of the FPGA 500.

The rule set processing block 502 includes rule memory 512. The rule memory 512 stores a rule set 513 against which bits received by the FID that includes the FPGA 500 are evaluated. The rule memory 512 can receive programming input, "PROGRAM," from a separate computing device, as described in greater detail below with respect to FIG. 6. The programming input programs the rule memory 512 such that the rule memory 512 stores the rule set 513.

The rule set processing block 502 further includes an address controller 514, a match tracker logic block 516, a delay logic block 518, and a rule output gate 520. The address controller 514 maintains an address counter that addresses locations in the rule memory 512. The rule set processing block 502 receives a payload "RX" that comprises an incoming bit to the FID (e.g., VAL) and its associated source data (e.g., DIR and/or WHICHBUS indicating whether the bit was received on a first bus transmission line or a second bus transmission line). The address controller 514 receives an indication that the payload is received. The address controller 514 outputs an address to the rule memory 512. Responsive to receiving the address, the rule memory 512 outputs a rule in the rule set 513 that is stored at the address. For example, the rule can be an 8-bit opcode stored in a byte of memory in the rule memory 512 that has the address output by the address controller 514.

The match tracker 516 receives the payload and the rule that is output by the rule memory 512. The match tracker 516 performs a comparison between the payload and the rule to determine whether the payload matches a matching condition specified by the rule. The match tracker 516 outputs an indication whether the payload matches the rule. For instance, the match tracker 516 can output a logic '0' when the payload does not match the rule and can output a logic '1' when the payload matches the rule. In various embodiments, the rule memory 512 and the match tracker 516 are configured such that the match tracker 516 receives only that portion of the rule that is used to indicate matching conditions. For instance, if the rule is an 8-bit opcode defined according to the opcode scheme depicted in FIG. 3, the rule memory 512 can be configured to output only the four matching bits 3-6 to the match tracker 516. In other embodiments, the rule memory 512 outputs the entire rule to the match tracker 516, and the match tracker 516 can be configured to perform the comparison between the payload and the rule based only upon that portion of the rule that specifies a matching condition.

The match tracker 516 outputs the indication whether the payload RX matches the rule to the address controller 514. The rule set 513 can be an ordered rule set in which rules are executed sequentially. As used herein, a rule is considered to be executed when the FPGA 500 performs an operation specified by the rule (e.g., as a result of the payload RX matching a matching condition specified by the rule). Responsive to receiving an indication that the payload RX matches the current rule from the match tracker 516, the address controller 514 advances an address counter to indicate a next rule in the rule set 513. Thus, when a subsequent payload is received by the FPGA 500, the rule memory 512 outputs the next rule in the rule set 513 to the match tracker 516. Responsive to receiving an indication from the match tracker 516 that the payload RX does not match the current rule, the address controller 514 can return the address counter to a current origin address of the rule set processing block 502. In some cases, the current origin address can be an address of a first rule in the rule set 513. In other instances, the current origin address can be an address set according to a reset origin opcode in the rule set 513 (e.g., as described above with respect to FIG. 4).

The match tracker 516 further outputs the indication whether the payload RX matches the rule to the rule output gate 520. The rule output gate 520 is configured to selectively output, to the priority logic block 504, an indication of an output selection specified by the current rule, based upon the output of the match tracker 516. When the match tracker 516 indicates that the current rule is matched by the payload RX, the rule output gate 520 can output the indication of the output selection. When the match tracker 516 indicates that the current rule is not matched by the payload RX, the rule output gate 520 can fail to output the indication of the output selection. In some embodiments, when the match tracker 516 indicates that the current rule is not matched by the payload RX, the rule output gate 520 can output a null code. In exemplary embodiments wherein the rules of the rule set 513 comprise opcodes, the rule output gate 520 can be configured to output the output select bits of the current rule opcode when the match tracker 516 indicates that the current rule is matched. In various embodiments, as is described in greater detail below, the output of the rule output gate 520 indicates one of several inputs to the output buffer 510 that are to be output by way of the output buffer 510.

The priority logic block 504 is configured to evaluate an output selection priority among several rule set processing blocks included on the FPGA 500. For example, in addition to the rule set processing block 502, the rule FPGA 500 can comprise additional rule set processing blocks 522, 524. While two additional rule set processing blocks 522, 524 are illustrated in FIG. 5, it is to be understood that the FPGA 500 can be configured to include substantially any number of rule set processing blocks. The rule set processing blocks 522, 524 can be configured similarly to the rule set processing block 502. Each of the rule set processing blocks 502, 522, 524 stores its own distinct rule set. The additional rule set processing blocks 522, 524 receive the payload RX and evaluate the payload RX against their respective rule sets. When the payload RX matches the current rule of one of the rule set processing blocks 522, 524, that rule set processing block outputs an indication of an output selection specified by the current rule of that block to the priority logic block 504. The output selections output by the rule set processing blocks 502, 522, 524 are each indicative of one of several inputs to the output buffer 510. Depending upon the payload RX and the configurations of the rule sets of the rule set processing blocks 522, 524, the rule set processing blocks 502, 522, 524 can output different, conflicting output selections to the priority logic block 504.

The priority logic block 504 is configured to select the output of one of the rule set processing blocks 502, 522, 524 to output to the output buffer 510 of the FPGA 500. Thus, the output of the priority logic block 504 comprises a selection of one of the inputs to the output buffer 510, which selection is based upon the outputs of the rule set processing blocks 502, 522, 524. The priority logic block 504 can select the output of one of the rule set processing blocks 502, 522, 524 based upon a predefined order of priority among the rule set processing blocks 502, 522, 524. In a non-limiting example, the priority logic block 504 can be configured to output, to the output buffer 510, the output of the rule set processing block 502 if the rule set processing block 502 is valid (i.e., the payload RX matches the current rule of the rule set processing block 502). Continuing the example, the priority logic block 504 can be configured to output the output of the rule set processing block 522 if the rule set processing block 502 is not valid. Continuing the example further, the priority logic block 504 can be configured to output the output of the rule set processing block 524 if both of the rule set priority logic blocks 502, 522 are not valid. In other embodiments, the priority logic block 504 can be configured to select one of the outputs of the rule set processing blocks 502, 522, 524 based upon the content of the outputs of the rule set processing blocks 502, 522, 524. If none of the rule set processing blocks 502, 522, 524 are valid, the priority logic block 504 can output an output selection that indicates that the output buffer 510 should output, as the output of the FPGA TX, the received bit VAL indicated by the payload RX.

The output buffer 510 receives the output selection selected by the priority logic block 504. Based upon the output selection, the output buffer 510 outputs one of its inputs. In exemplary embodiments, the output buffer 510 receives, as input, the received bit value VAL, the inverse of VAL (e.g., from an inverter 526 that receives VAL), logic '1', logic '0', a parity bit output by the parity generator 506, or a checksum bit value output by the checksum generator 508. The output buffer 510 outputs one of these inputs as output of the FPGA 500, based upon the output selection that the output buffer 510 receives from the priority logic block 504. It is to be understood that while the output buffer 510 receives an output selection from the priority logic block 504, the output buffer 510 can instead be configured to receive the output selection directly from one of the rule set processing blocks 522, 524. For example, the FPGA 500 can be configured to have only a single rule set processing block (e.g., the rule set processing block 502), and the output buffer 510 can receive the output selection directly from this single rule set processing block.

The parity generator 506 also receives the output of the output buffer 510. For each bit output by the output buffer 510, the parity generator 506 recomputes a parity value. In an embodiment wherein the FPGA 500 is included on the FID 120, the output of the output buffer 510 is transmitted along the communications bus 112 or to the bus controller 114. Thus, the parity generator 506 maintains an accurate parity value based upon bits actually transmitted to a communications bus, bus controller, or other remote terminal with which a FID that includes the FPGA 500 is in communication. In exemplary embodiments, the parity generator 506 can be configured to reset a computed parity value when the payload RX comprises a sync pulse that indicates the start of a new MIL-STD-1553/1760 message. The parity generator 506 outputs the current, "corrected" parity value to the output buffer 510. The output buffer 510 can selectively output the corrected parity value as the output TX of the FPGA 500, based upon an output selection received by the output buffer 510 from the priority logic block 504. For instance, the rule set 513 can be configured such that at the end of a MIL-STD-1553/1760 command word, status word, or data word received by the FPGA 500, the output buffer 510 is controlled to transmit the corrected parity value.

Similarly, the checksum generator 508 receives the output of the output buffer 510 and recomputes a checksum for each bit output by the output buffer 510. MIL-STD-1760 employs checksums for the purpose of validating communications transmitted over a MIL-STD-1760 communications bus. The checksum generator 508 can compute a checksum based upon bits actually transmitted by a FID that includes the FPGA 500 (e.g., the bits output by the output buffer 510). The checksum maintained by the checksum generator 508 can comprise several bits. Hence, the checksum generator 508 can be configured to shift out bits of the checksum to the output buffer 510 responsive to the output buffer 510 receiving an output selection indicating that the output buffer 510 should output the checksum.

Embodiments described herein are well-suited to selectively introducing faults to a MIL-STD-1553/1760 communications system, without otherwise inhibiting the ordinary operation of the MIL-STD-1553/1760 communications system. For instance, the FPGA 500 employs various bit comparison operations to evaluate incoming bits against a set of rules, which bit comparison operations can be completed sufficiently quickly that a FID that incorporates the FPGA 500 does not cause a bus fault by leaving the bus hanging for an extended period. For instance, if the FID 120 received a communication from the communications bus 112 and waited until the entirety of that message was received before retransmitting a modified message to the bus controller 114, the FID 120 might cause the communications system 104 to enter a fault state. If the bus controller 114 determines that a response from one of the remote terminals 116, 118 along the communications bus 112 is delayed for a time greater than that specified by MIL-STD-1553/1760, the bus controller 114 can determine that the communications system 104 has experienced a fault, thereby preventing further normal operation of the communications system 104. Such faults, if induced by operation of the FID 120, would prevent the FID 120 from selectively introducing faults in the communications system 104 based upon normal operation of the communications system 104.

As described above with respect to FIG. 4, some of the rules in the rule set 206 can be configured to cause the rule processing logic 205 to perform functions other than controlling output of the FPGA 204 based upon matching bits received by the FPGA 204 from the transceiver 202. For example, as indicated in the truth table 402, the rule set 206 can include rule opcodes that cause the rule processing logic 205 to implement a time delay in which further bits received by the FPGA 204 are not evaluated by the rule processing logic 205. In further examples, as also indicated in the truth table 402, the rule set 206 can include rule opcodes that cause the rule processing logic 205 to modify an address counter that determines which rule in the rule set 206 is the current rule against which a next-received bit will be evaluated. Accordingly, and referring again to FIG. 5, the address controller 514 and the delay logic block 518 of the rule set processing block 502 can be configured to receive opcodes from the rule memory 512 and to perform operations based upon the opcodes.

By way of example, and not limitation, the delay logic block 518 can receive an opcode from the rule memory 512. Responsive to receipt of the opcode, the delay logic block 518 can determine whether the opcode indicates a delay function. For example, if the opcode is defined according to the scheme set forth in the exemplary opcode 400, the delay logic block 518 can determine if the opcode has ALT and OP bits set to logic '1' and logic '0', respectively. If ALT is set to logic '1' and OP is set to logic '0', then the delay logic block 518 can cause the rule set processing block 502 to implement a delay defined by bits D5-D0 of the opcode 400. Stated differently, the delay logic block 518 can control the address controller 514 such that the address controller 514 does not increment the address counter for the duration specified by bits D5-D0.

In another example, the address controller 514 can receive an opcode from the rule memory 512. Responsive to receipt of the opcode, the address controller 514 can determine whether the opcode indicates a modification of the address counter maintained by the address controller 514. For example, if the opcode is defined according to the scheme set forth in the exemplary opcode 400, the address controller 514 can determine if the opcode has ALT and OP bits set to logic '1.' If the ALT and OP bits of the opcode are set to logic '1', then then the address controller can implement a function defined by bits D5-D0 of the opcode 400. For instance, the address controller 514 can reset the origin of the address counter, can skip a next-received bit without advancing the address counter, can reset the address counter to the current origin, or can reset the address counter to a first rule in the rule set 513 (e.g., based upon receiving an opcode indicating that the end of the rule set has been reached). In some embodiments, the address controller 514 includes a rule set counter that counts a number of times that a rule set has been executed. The address controller 514 can be configured to disable the rule set processing block 502 responsive to reaching a threshold number of times that the rule set has been executed. The address controller 514 can be configured to increment the rule set counter responsive to receipt of an opcode indicating that the end of the rule set 513 has been reached.

In some embodiments, the rule set processing block 502 can be configured such that the rule set processing block 502 executes rules in the rule set 513 based upon a clock of the MIL-STD-1553/1760 communications system with which the FPGA 500 communicates (e.g., the MIL-STD-1553/1760 communications system 104). In these embodiments, the rule set processing block 502 can execute rules in the rule set 502 based upon a timing indicated by the clock of the MIL-STD-1553/1760 communications system irrespective of whether bits are being received by the FPGA 500 from a transceiver. In further embodiments, the rule set processing block 502 can be configured to selectively execute rules in the rule set 513 based upon the clock of the MIL-STD-1553/1760 communications system or the receipt of additional bits at the payload RX. For instance, if a current rule of the rule set 513 is an opcode that does not depend on matching a received bit (e.g., an opcode defined according to the scheme set forth in the exemplary opcode 400), the rule set processing block 502 can execute the current rule based upon the clock of the communications system irrespective of whether bits are being received by the FPGA 500. If a current rule of the rule set 513 is an opcode that does depend on matching a received bit (e.g., an opcode defined according to the scheme set forth in the exemplary opcode 300), the rule set processing block 502 can be configured to wait to execute the current rule until an additional bit is received at the payload RX.

Figure 6:
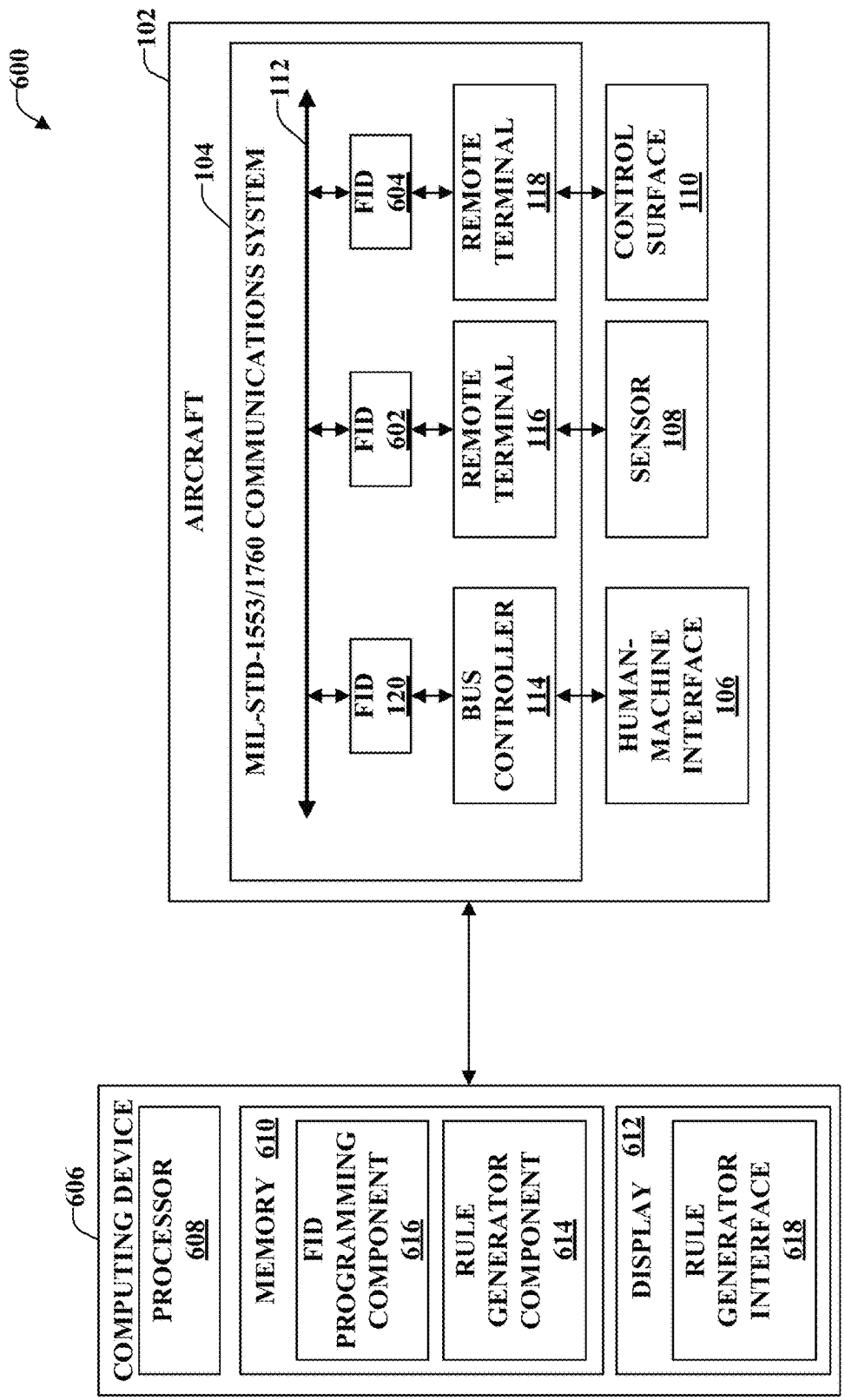
FIG. 6 is a functional block diagram of an exemplary system that facilitates programming FIDs.

In various embodiments, a FID can be programmed by a user based upon user interaction with a graphical user interface. Referring now to FIG. 6, another exemplary system 600 that facilitates field testing of MIL-STD-1553/1760 communication systems is illustrated. The system 600 includes the aircraft 102, which comprises the MIL-STD-1553/1760 communications system 104, the HMI 106, the sensor 108, and the control surface 110. In the exemplary system 600, the MIL-STD-1553/1760 communications system 104 can further include a FID 602 that is positioned between the remote terminal 116 and the communications bus 112, and a FID 604 that is positioned between the remote terminal 118 and the communications bus 112. The FIDs 602, 604 can perform substantially similar functionality to functionality described above with respect to the FID 120. The FIDs 602, 604 can be employed to selectively output communications faults to the remote terminals 116, 118, respectively, without requiring such communications faults to be output to the communications bus 112. For example, the FID 604 can selectively output a communications fault to the remote terminal 118, based upon traffic on the communications bus 112, without outputting that communications fault to the communications bus 112. The FID 604 can therefore introduce communications faults to the remote terminal 118 in order to test functionality of the control surface 110 based upon traffic on the communications bus 112. By contrast, in order to communicate with the remote terminal 118, the FID 120 must output a signal to the communications bus 112, which may be undesirable for various reasons (e.g., because such communication would also be received by the remote terminal 116).

The system 600 can further include a computing device 606 that is configured to program the FIDs 120, 602, 604 with different rule sets that are configured to cause the FIDs 120, 602, 604 to implement intended functionality with respect to traffic on the communications bus 112. The computing device 606 comprises a processor 608, memory 610 that stores instructions that are executed by the processor 608, and a display 612. The memory 610 includes a rule generator component 614 and a FID programming component 616. The rule generator component 614 is configured to display a rule generator interface 618 on the display 612. The rule generator interface 618 is a graphical user interface (GUI) that is configured to receive user input that defines an intended functionality of a set of rules according to which one of the FIDs 120, 602, 604 will be programmed. Responsive to receiving the user input by way of the rule generator interface 618, the rule generator component 614 generates a set of rules that, when executed by one of the FIDs 120, 602, 604, causes the FID to implement the intended functionality defined by the user input. In other words, the rule generator component can translate user-specified functionality into a set of rules that can be implemented by the FIDs 120, 602, 604 to perform the user-specified functionality.

The rule generator component 614 can output the set of rules to the FID programming component 616, whereupon the FID programming component 616 programs one or more of the FIDs 120, 602, 604 based upon the set of rules. In an exemplary embodiment, the set of rules generated by the rule generator component 614 can be a set of opcodes, and the FID programming component 616 can program one of the FIDs 120, 602, 604 such that the FID stores the set of opcodes in memory of an FPGA included on the FID.

A user of the computing device 606 can specify, by way of the rule generator interface 618, a different functionality for each of the FIDs 120, 602, 604. The rule generator component 614 can generate a different set of rules for each of the FIDs 120, 602, 604, and the FID programming component 616 can program each of the FIDs 120, 602, 604 based upon a different set of rules generated by the rule generator component 614.

Figure 7:
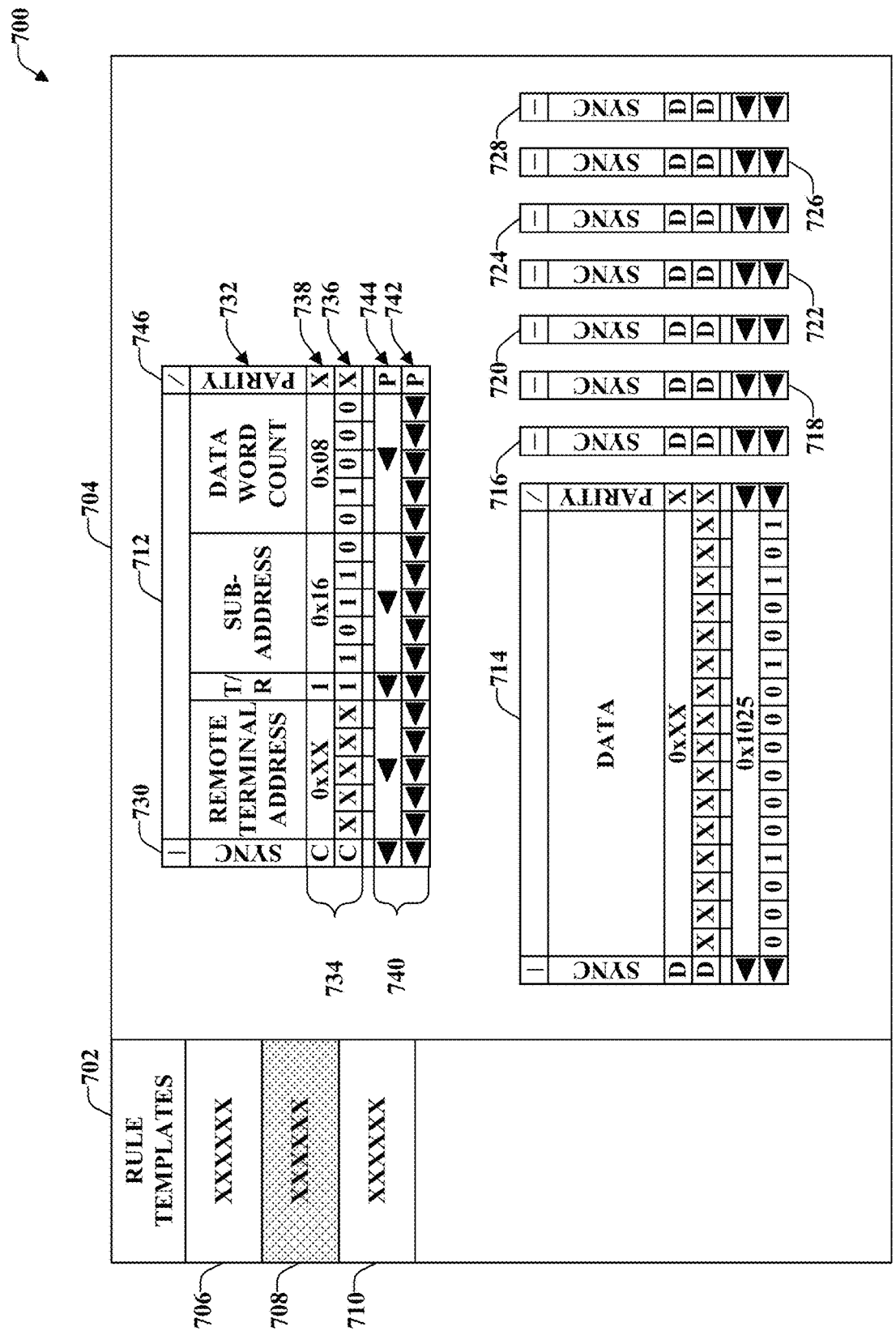
FIG. 7 illustrates an exemplary GUI.

Referring now to FIG. 7, an exemplary GUI 700 that facilitates specifying an intended functionality of a FID with respect to communication occurring on a MIL-STD-1553/1760 communications bus is illustrated. For example, the rule generator interface 618 can be or include the GUI 700. The GUI 700 comprises a rule template selection pane 702 and a message selection pane 704. The rule template selection pane 702 comprises a plurality of selectable buttons 706-710. Each of the selectable buttons 706-710 corresponds to a different rule template. A rule template comprises a plurality of MIL-STD-1553/1760 words that together form a MIL-STD-1553/1760 message from the bus controller 114 to one of the remote terminals 116, 118 or vice versa. The message selection pane includes a representation of each of the words of a rule template selected in the rule template selection pane 702. In the exemplary GUI 700 shown, the selectable button 708 is selected. The selectable button 708 corresponds to a rule template that comprises a command word and 8 data words. This rule template can be, for example, a 9-word message from the bus controller 114 to one of the remote terminals 116, 118.

The message selection pane 704 comprises a representation of the command word 712 and a respective representation 714-728 of each of the 8 data words. A user can interact with the representations 712-728 to specify rules pertaining to the words. Each of the word representations 712-728 comprises a selectable button that, when selected, expands or collapses the representation of the word. For example, the representation 712 of the command word comprises a selectable button 730. The representation 712 of the command word is shown in the GUI 700 in its expanded form. Hence, when the selectable button 730 is selected, the representation 712 of the command word will be collapsed. When expanded, the representations 712-728 of the words can show a descriptive label for each of the bits of the word, match conditions for each of the bits of the word, and an output selection for each of the bits of the word. Thus, when expanded, the representations 712-728 show, at a glance, functionality of a set of rules pertaining to words of the selected rule template.

Referring again to the representation 712 of the command word, the representation 712 comprises a row of descriptive labels 732 for the bits of the command word. The descriptive labels in a representation of a word are based upon the type of word to which the representation pertains. For instance, a MIL-STD-1553/1760 command word generally includes a sync bit, 5 remote terminal address bits, a transmit/receive (T/R) bit that indicates whether a remote terminal should receive or transmit in response to receiving the command word, 5 sub-address/module address bits, 5 data word count bits, and one parity bit. Hence, the representation 712 of the command word comprises a label indicating the sync bit, a label indicating the remote terminal address bits, a label indicating the T/R bit, a label indicating the sub-address/module address bits, a label indicating the data word count bits, and a label indicating the parity bit. The row of descriptive labels 732 includes a plurality of columns, one for each of the descriptive labels. Each of the columns has a width spanning a number of bits that correspond to the label of the column. Thus, the column corresponding to the sync label has a width of one bit, whereas the column corresponding to the remote terminal address label has a width of 5 bits.

The representation 712 further comprises a match section 734 that indicates a match value for each of the bits of the command word. The match section 734 comprises a row 736 that includes a representation for each of the bits of the command word indicating a match value for the bit. The match section 734 further comprises a row 738 that comprises fields that each indicate a match value for a group of bits in the command word. The groups of bits correspond to the descriptive labels of the row of descriptive labels 732. Thus, for example, the match value for the data word count bits of the command word represented by the representation 712 can be represented by a single hexadecimal number, 0×08, that may be easier to read at a glance than the corresponding bits '01000' in the row 736 that specifies bit match values.

The representation 712 further comprises an output select section 740 that indicates an output select value for each of the bits of the command word. The output select section 740 comprises a row 742 that comprises a representation for each of the bits of the command word indicating an output selection value for the bit. The output select section further comprises a row 744 that comprises fields that each indicate a match value for a group of bits in the command word. Like the row 738, the fields of the row 744 represent values of groups of bits that correspond to the descriptive labels of the row of descriptive labels 732. In the exemplary representation 712 of the command word, other than the parity bit, the output select bits shown in the output select section 740 are all represented by a left-pointing arrow, indicating that when the bits indicated by the match section 734 are received, a FID should output those same received bits.

When expanded, the representations 712-728 of the words of the selected template each include a selectable button that, when selected, opens a message word editing pane. For example, the representation 712 of the command word can include a second selectable button 746 that, when selected, opens an editing pane that allows match conditions and/or output selection for the command word to be modified.

Figure 8:
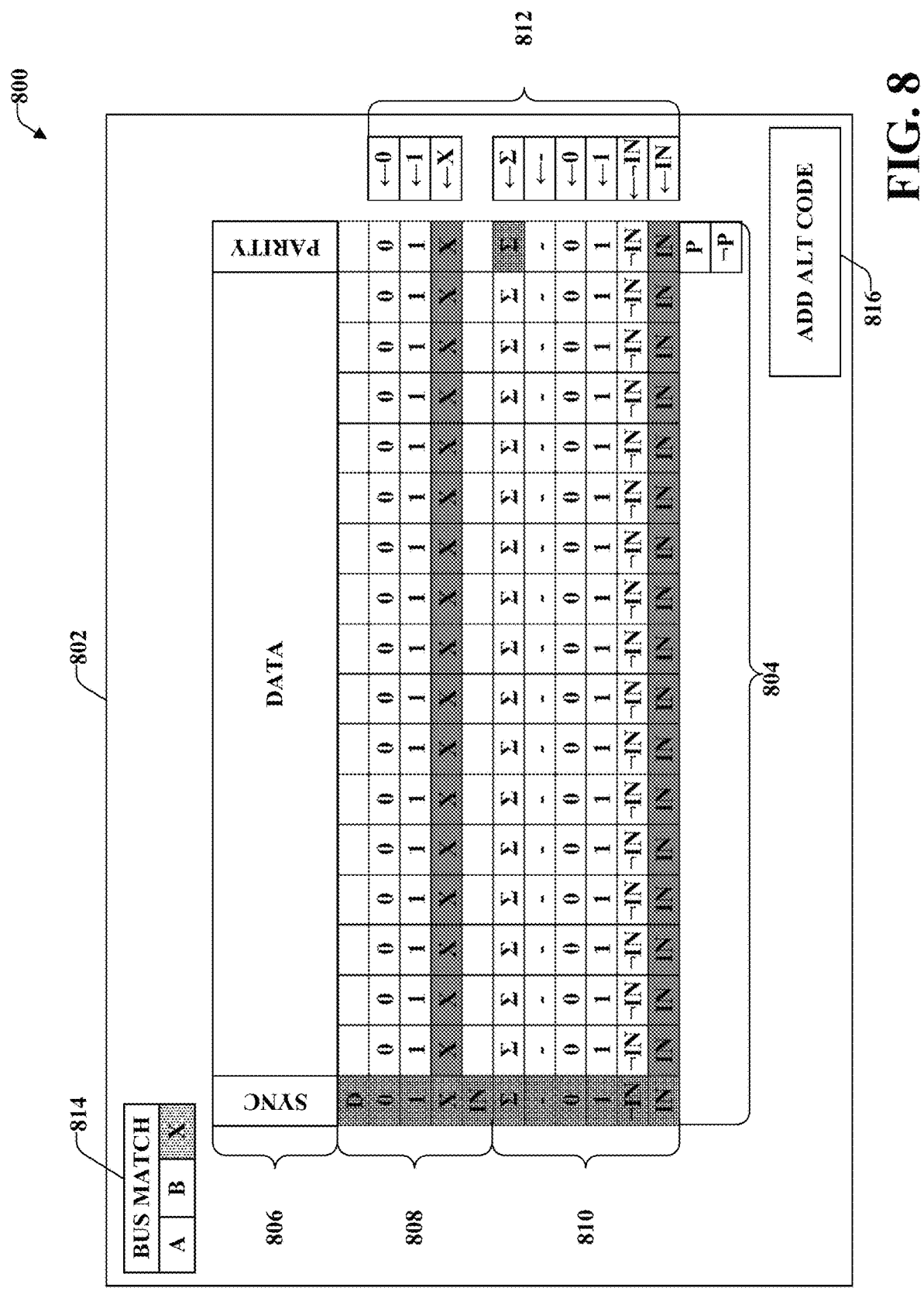
FIG. 8 illustrates another exemplary GUI.

Referring now to FIG. 8, an exemplary editing pane GUI 800 is illustrated. The GUI 800 comprises a representation 802 of a set of rules to be applied to a MIL-STD-1553/1760 word, in this case a data word. The representation 802 comprises a table 804 having a column for each of the bits of the data word (e.g., a column for the sync bit, a respective column for each of 16 data bits, and a column for a parity bit). The representation 802 includes a row 806 of descriptive labels that explain the function of each of the bits of the word that the representation 802 represents. Thus, the row 806 includes a "sync" label corresponding to the sync bit of the data word, a "data" label corresponding to the data bits of the data word, and a "parity" label corresponding to the parity bit of the data word. The table 804 comprises a match section 808 and an output select section 810. The match section 808 comprises a plurality of rows that each represent a different potential match value for a bit in the data word. Similarly, the output select section 810 comprises a plurality of rows that each represent a different potential output select value for a matched bit in the data word. Each column of the table 804 therefore specifies a match condition for a respective bit of a MIL-STD-1553/1760 word and a corresponding output selection for the bit. Thus, each column of the table 804 defines a rule pertaining to a bit of the data word to which the representation 802 pertains. Taken as a whole, the table 804 can specify an ordered set of rules that seeks a match for a MIL-STD-1553/1760 data word and specifies an output for the matched data word, which output may be modified from the matched data word.

Cells of the table 804 can be selectable buttons. Responsive to being selected, a cell in the table 804 can be highlighted to indicate the selection. Selection of a cell in the match section 808 of a column of the table 804 sets a match condition for a rule in an ordered set of rules pertaining to a data word. The GUI 800 can be configured such that only one cell in the match section 808 of a column of the table 804 can be selected at a time. For instance, a match condition for the parity bit can be set to only one of '0', '1', or 'X' (don't care). Likewise, the GUI 800 can be configured such that only one cell in the output select section 810 of a column of the table 804 can be selected at a time. For instance, an output selection condition for the parity bit can be set to only one of (output inhibit), '0', '1', '—IN' (opposite of received input), 'IN' (received input), P (parity value, e.g., as output by the parity generator 506), or A '/' option corresponding to a MIL-STD-1760 checksum is grayed out for the parity bit, but not the data bits, because a MIL-STD-1760 checksum is a 16-bit value transmitted in the 'data' portion of an 18-bit MIL-STD-1760 data word.

The GUI 800 can further include a plurality of buttons 812 that are each configured to select all cells in a corresponding row of the table 804. Still further, the GUI 800 can include a selectable element 814 by way of which a user can select from which of several redundant MIL-STD-1553/1760 buses received bits can be considered a match for the set of rules specified by the representation 802. Yet further, the GUI 800 can include a selectable element 816 that, when selected, can add an alt code (e.g., as described above with respect to FIG. 4) to the set of rules specified by the representation 802.

One or more elements of the GUI 800 (e.g., cells of the table 804) can be grayed out. For instance, if the GUI 800 is presented to a user responsive to the user selecting the edit button 746 in the GUI 700, selections inconsistent with a MIL-STD-1553/1760 command word can be grayed out. The column of the table 804 that represents the sync bit is grayed out in the GUI 800 because the representation 802 relates to a data word. Thus, the user can be prevented from setting the match or output select conditions of the sync bit to correspond to anything other than a data word sync bit value.

Figure 9:
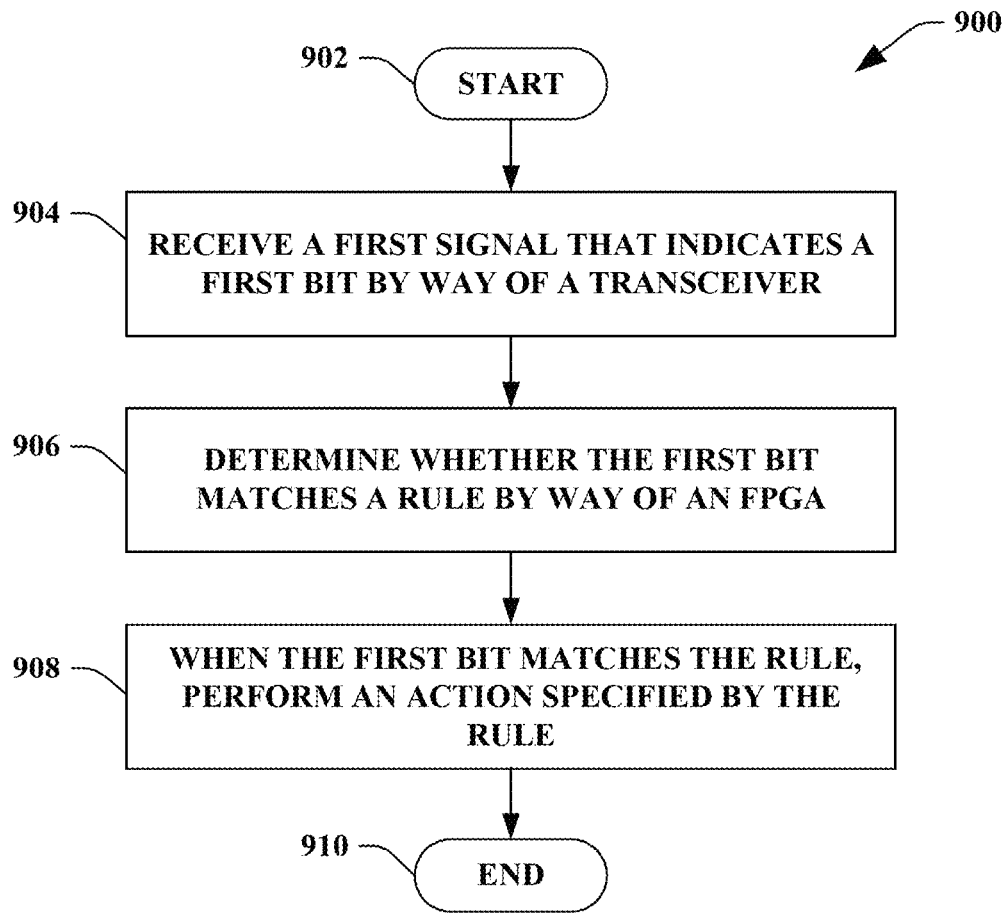
FIG. 9 is a flow diagram that illustrates an exemplary methodology for selectively causing faults on a MIL-STD-1553/1760 communications system.

FIG. 9 illustrates an exemplary methodology relating to selectively introducing faults to a MIL-STD-1553/1760 communications system during real-time operation of the communications system. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 9, a methodology 900 that facilitates selectively introducing faults to a MIL-STD-1553/1760 communications system is illustrated. The methodology 900 begins at 902, and at 904, a first signal that indicates a first bit is received by way of a transceiver. The transceiver can be configured to communicate with a MIL-STD-1553/1760 communications bus according to either or both of the MIL-STD-1553 or MIL-STD-1760 communications protocols. The transceiver can be included on a FID that also includes an FPGA. The FID can be communicatively coupled between the communications bus and a terminal such that the FID receives signals from each of the communications bus and the terminal. The terminal can be a bus controller configured to control communications occurring on the communications bus, or the terminal can be a remote terminal that communicates on the communications bus in response to messages received from the bus controller. The transceiver can receive the first signal from either of the communications bus or the terminal.

At 906, the FPGA determines whether the first bit indicated by the first signal matches a rule. In an exemplary embodiment, the rule can be a currently-addressed rule in an ordered set of rules that is stored by the FPGA, and against which the FPGA successively evaluates bits received by way of the transceiver. If the first bit fails to match the rule, the FPGA can cause the transceiver to retransmit the first bit to whichever of the communications bus or the terminal the transceiver did not receive the first signal from. In other words, if the first bit fails to match the rule, the FID "passes through" the first bit either from the communications bus to the terminal or from the terminal to the communications bus.

At 908, if the first bit does match the rule, the FPGA performs an action specified by the rule. In a non-limiting example, the rule can specify that the FPGA should cause the transceiver to transmit the same first bit that was received. In another example, the rule can specify that the FPGA should cause the transceiver to transmit the opposite bit than the first bit that was received. In still another example, the rule can specify that the FPGA should cause the transceiver to fail to output a signal in response to receiving the first signal. At 910, the methodology 900 ends.

Figure 10:
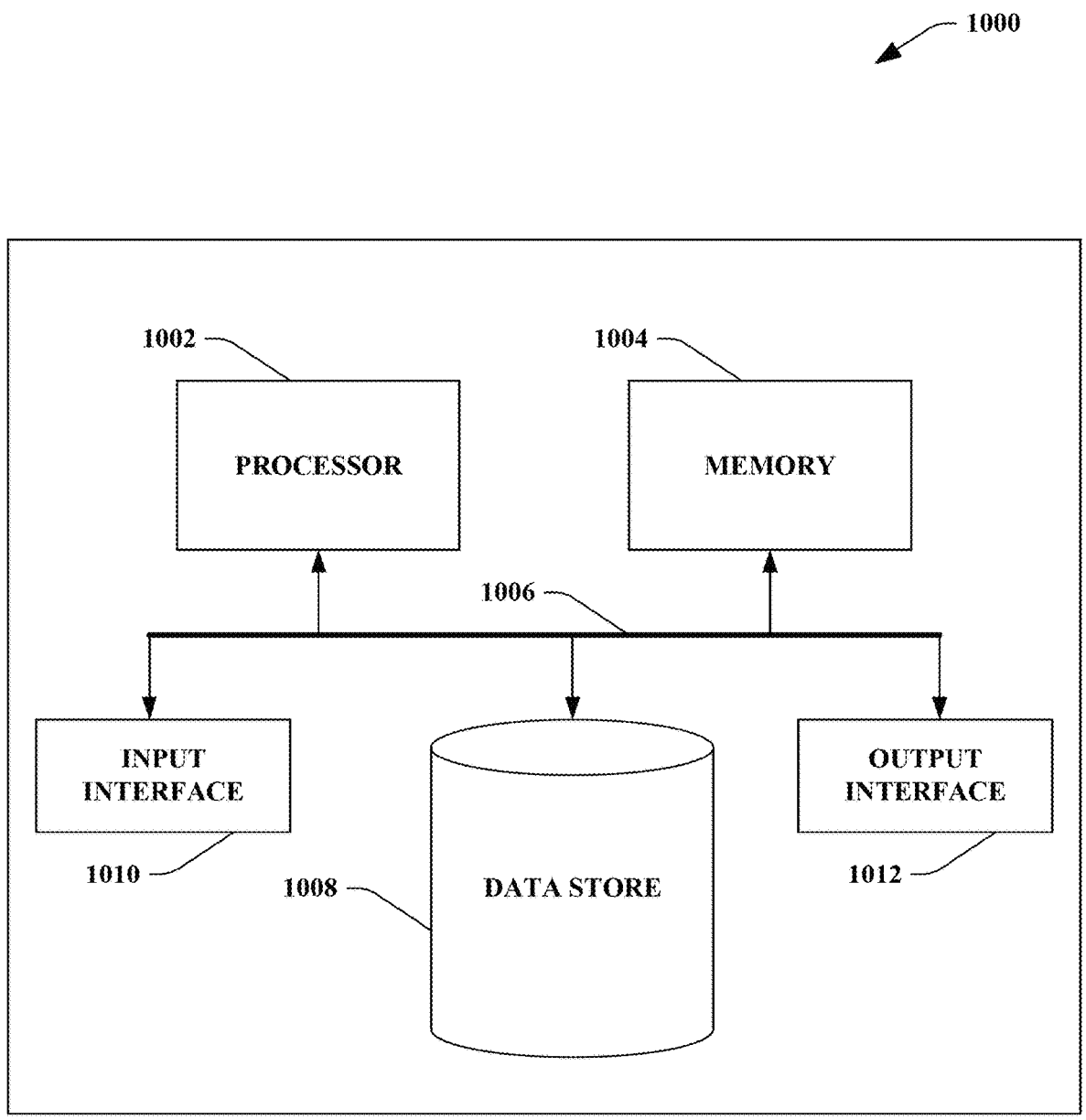
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system for programming a FID. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store a set of rules for programming a FID.

The computing device 1000 additionally includes a data store 1008 that is accessible by the processor 1002 by way of the system bus 1006. The data store 1008 may include executable instructions, a set of rules for programming a FID, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc., by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a transceiver that is configured to receive and transmit messages by way of a communications bus that is configured as a MIL-STD-1553 or MIL-STD-1760 communications bus;
    a field-programmable gate array (FPGA) that is communicatively coupled to the transceiver such that the FPGA can transmit and receive messages on the communications bus by way of the transceiver, the FPGA configured to perform acts comprising:
        responsive to receiving, at the transceiver, a first signal from the communications bus, the first signal indicative of a first bit, determining whether the first bit matches a rule; and
        responsive to determining that the first bit matches the rule, performing an action specified by the rule, wherein the action comprises one of:
            causing the transceiver to transmit a second signal that is indicative of the first bit;
            causing the transceiver to transmit a third signal that is indicative of a second bit that is different from the first bit; or
            causing the transceiver to fail to transmit a signal responsive to receiving the first bit.

2. The system of claim 1, wherein the rule is a first rule, and wherein the first signal is further indicative of a third bit, the acts further comprising:
    determining whether the third bit matches a second rule; and
    responsive to determining that the third bit matches the second rule, performing a second action specified by the second rule, wherein the second action comprises one of:
        causing the transceiver to transmit a fourth signal that is indicative of the third bit;
        causing the transceiver to transmit a fifth signal that is indicative of a fourth bit that is different from the third bit; or
        causing the transceiver to fail to transmit a signal responsive to receiving the third bit.

3. The system of claim 2, wherein the FPGA determines whether the second bit matches the second rule based upon the first bit matching the first rule.

4. The system of claim 1, wherein determining whether the first bit matches the rule is based upon a value of the first bit and a source of the first signal.

5. The system of claim 4, the rule comprising a multi-bit code, wherein a first bit in the multi-bit code is indicative of a match value of the first bit and a second bit in the multi-bit code is indicative of a match value of the source of the first signal.

6. The system of claim 1, wherein the transceiver is configured to receive and transmit messages by way of a MIL-STD-1760 communications bus, wherein the acts further comprise generating a checksum based upon one of the first bit or the second bit.

7. The system of claim 1, wherein the rule is one of an ordered set of rules, wherein the FPGA is configured to evaluate successively received bits against the ordered set of rules in a predefined order.

8. The system of claim 7, wherein responsive to determining that the first bit does not match the rule, resetting an address counter to an origin position in the ordered set of rules, wherein responsive to receipt of a second signal indicative of a third bit at the transceiver, the FPGA determines whether the third bit matches a second rule at the origin position in the ordered set of rules.

9. The system of claim 7, wherein the ordered set of rules comprises a second rule, wherein the FPGA executes the second rule, wherein the second rule is one of:
   a delay rule that causes the FPGA not to evaluate signals received by the transceiver for a period of time defined by the delay rule;
   an origin reset rule that causes the FPGA to reset an address counter that specifies an execution position in the ordered set of rules;
   a skip rule that causes the FPGA to fail to evaluate a bit against a rule in the ordered set of rules; or
   an origin specification rule that causes the FPGA to modify an origin position for the address counter.

10. The system of claim 7, wherein the FPGA maintains a rule set counter with respect to the ordered set of rules, the FPGA configured to increment the rule set counter responsive to performing an action specified by a last rule in the ordered set of rules, and wherein responsive to the rule set counter exceeding a threshold, the FPGA ceases executing the ordered set of rules.

11. The system of claim 2, further comprising: responsive to receiving the first signal by way of the transceiver, determining that the first bit matches a second rule, wherein performing the action specified by the first rule is based upon the first rule having a higher priority than the second rule.

12. The system of claim 1, wherein the rule is a first rule, the system further comprising a computing device, wherein the computing device comprises:
   a processor; and
   memory that stores instructions that, when executed by the processor, cause the processor to perform acts comprising:
      responsive to receipt of user input, programming the FPGA to include a set of rules that includes the first rule.

13. The system of claim 12, the computing device further comprising a display that displays a graphical user interface (GUI), wherein the user input is based upon user interaction with the GUI, the GUI comprising a graphical representation of a set of rules that includes the first rule.

14. The system of claim 13, the graphical representation of the set of rules comprising a table, the table comprising a plurality of columns, wherein each of the columns is representative of a respective bit in a MIL-STD-1553 or MIL-STD-1760 word.

15. The system of claim 14, wherein the table further comprises a first plurality of rows and a second plurality of rows, the first plurality of rows comprising selectable elements that specify matching conditions for bits of the word, the second plurality of rows comprising selectable elements that specify output select conditions for bits of the word.

16. The system of claim 1, wherein the transceiver comprises a first transceiver component and a second transceiver component, wherein the first transceiver component is configured to transmit and receive messages on a first portion of the communications bus, and wherein the second transceiver component is configured to transmit and receive messages on a second portion of the communications bus.

17. A method, comprising:
   responsive to receiving a first signal by way of a transceiver that is configured to receive and transmit messages by way of a MIL-STD-1553 or MIL-STD-1760 communications bus, the first signal indicative of a first bit, outputting the first bit to an FPGA that is communicatively coupled to the transceiver such that the FPGA can transmit and receive messages on the communications bus by way of the transceiver; and
   responsive to determining, by way of the FPGA, that the first bit matches a rule, performing an action specified by the rule, wherein the action comprises one of:
      causing the transceiver to transmit a second signal that is indicative of the first bit;
      causing the transceiver to transmit a third signal that is indicative of a second bit that is different from the first bit; or
      causing the transceiver to fail to transmit a signal responsive to the transceiver receiving the first signal.

18. A system comprising: a MIL-STD-1553/MIL-STD-1760 communications bus; a terminal that comprises one of a bus controller or a remote terminal, the terminal configured for operation according to at least one of a MIL-STD-1553 communications protocol or a MIL-STD-1760 communications protocol; and a fault insertion device (FID) communicatively coupled between the communications bus and the terminal such that the FID receives transmits and receives messages to and from each of the terminal and the communications bus, the FID comprising a field-programmable gate array (FPGA) that is configured to perform the following acts: responsive to receiving, at the FID, a first signal that indicates a first bit, the first signal received from one of the communications bus or the terminal, determining whether the first bit matches a rule; responsive to determining that the first bit fails to match the rule, causing the FID to transmit a second signal to another of the communications bus or the terminal, the second signal indicative of the first bit; and responsive to determining that the first bit matches the rule, performing an action specified by the rule.

19. The system of claim 18, wherein the action specified by the rule comprises inhibiting the FID from outputting a signal that indicates the first bit to another of the communications bus or the terminal.

20. The system of claim 18, wherein the action specified by the rule comprises causing the FID to transmit, to another of the communications bus or the remote terminal, a third signal that indicates a second bit different from the first bit.

* * * * *